US011912355B2

(12) United States Patent
Berube

(10) Patent No.: US 11,912,355 B2
(45) Date of Patent: Feb. 27, 2024

(54) TRACK CLEAT FOR ENDLESS TRACK VEHICLE

(71) Applicant: Quanta Associates, L.P., Houston, TX (US)

(72) Inventor: Daniel Robert Berube, Bow, NH (US)

(73) Assignee: Quanta Associates, L.P., Houston, TX (US)

( * ) Notice: Subject to any disclaimer, the term of this patent is extended or adjusted under 35 U.S.C. 154(b) by 541 days.

(21) Appl. No.: 17/121,356

(22) Filed: Dec. 14, 2020

(65) Prior Publication Data

US 2021/0188377 A1     Jun. 24, 2021

Related U.S. Application Data

(60) Provisional application No. 62/953,029, filed on Dec. 23, 2019.

(51) Int. Cl.
*B62D 55/28* (2006.01)
*B62D 55/32* (2006.01)

(52) U.S. Cl.
CPC .......... *B62D 55/286* (2013.01); *B62D 55/32* (2013.01)

(58) Field of Classification Search
CPC ........ B62D 55/27; B62D 55/28; B62D 55/32; B62D 55/283; B62D 55/286; B60F 3/0015
USPC ....................................................... 305/180
See application file for complete search history.

(56) References Cited

U.S. PATENT DOCUMENTS

| | | | |
|---|---|---|---|
| 2,040,696 A | | 5/1936 | Johnston |
| 3,071,417 A | * | 1/1963 | Militana ................ B62D 55/28 305/191 |
| 4,261,622 A | | 4/1981 | Miller |
| 4,482,193 A | | 11/1984 | Boggs et al. |
| 5,400,734 A | * | 3/1995 | Doyon .................. B60F 3/0007 440/12.51 |
| 5,642,921 A | | 7/1997 | Webb et al. |
| 5,676,437 A | | 10/1997 | Holmgren et al. |
| 6,125,956 A | | 10/2000 | Gignac |
| 6,264,293 B1 | * | 7/2001 | Musselman ............ B62D 55/28 305/178 |
| 7,901,015 B1 | * | 3/2011 | Anderson .............. B62D 55/28 305/51 |

(Continued)

FOREIGN PATENT DOCUMENTS

| | | |
|---|---|---|
| CA | 2433911 A1 | 12/2004 |
| CN | 206186668 U | 5/2017 |

(Continued)

*Primary Examiner* — S. Joseph Morano
*Assistant Examiner* — Eva L Comino
(74) *Attorney, Agent, or Firm* — Oathout Law Firm; Mark A. Oathout; Elizabeth Gray

(57) ABSTRACT

An endless track vehicle with increased traction and/or installation, modification, and/or use of track cleats for traction for the endless track of the endless track vehicle. A body is mountable to the endless track exterior. The body defines bores extending from a first end of the body to a second end of the body, wherein the bores have counterbores. First and second cleats/bolts respectively having a cleat/bolt heads, the cleats/bolts mounted in respective bores and optional extending out a distance out of the second end of the body, wherein the cleat/bolt heads seat in the respective counterbores. Nuts may be used in the counterbores to optionally extend the cleats/bolts, and/or to secure and fasten the cleats/bolts.

9 Claims, 12 Drawing Sheets

(56) References Cited

U.S. PATENT DOCUMENTS

| | | |
|---|---|---|
| 9,004,618 B1 | 4/2015 | Delisle et al. |
| 9,637,188 B2 | 5/2017 | Hall |
| 10,351,188 B2 | 7/2019 | Hogue et al. |
| 10,421,508 B2 | 9/2019 | Blackburn |
| 2004/0174068 A1 | 9/2004 | McNutt et al. |
| 2014/0246899 A1* | 9/2014 | Park ................. B62D 55/28 305/189 |
| 2015/0217817 A1* | 8/2015 | Delisle ............... B62D 55/26 305/180 |
| 2016/0257358 A1 | 9/2016 | Johnson |
| 2017/0297639 A1 | 10/2017 | Musselman et al. |
| 2018/0327037 A1 | 11/2018 | Blackburn |

FOREIGN PATENT DOCUMENTS

| | | | | |
|---|---|---|---|---|
| CN | 107380287 | * | 11/2017 | ............ B62D 55/28 |
| JP | 2005096583 | * | 4/2005 | ............ B29B 17/00 |
| SE | 462709 | * | 1/1983 | ............ B62D 55/26 |
| WO | WO-2020023344 A1 | * | 1/2020 | ............ B62D 55/20 |

* cited by examiner

TRACK CLEAT FOR ENDLESS TRACK VEHICLE

TECHNICAL FIELD

The disclosure relates to the field of traction for endless track vehicles or track equipment.

BACKGROUND

Certain weather and conditions of the environment make successful, efficient operation of an endless track vehicle or track equipment difficult or impossible. For example, a tracked digger or loader may slide or slip when operated on ice, snow, or mud. Rubber pads have been installed in the past for enhancing the traction of the endless track vehicle or track equipment (e.g. a bulldozer track, or any other tracked construction vehicle). These prior installations have attachment bolts that are embedded into the pads in vulcanized rubber. The vulcanized rubber separates from the traction or track pad (e.g. the bolt strips out of the rubber when tightening or torqueing). Moreover the prior pads may be slippery on ice, snow, mud, etc.

BRIEF SUMMARY

The present disclosure relates to embodiments of a track cleat or apparatus for traction. The present disclosure relates to embodiments of methods for increasing traction and/or installation, modification, and/or use of track cleat for traction.

As used herein the term "counterbore" includes counterbores, countersinks, tapered holes, and/or other counterbores/countersinks/holes, and/or includes counterbores/countersinks/holes having, in part or in whole, cylindrical shapes, hexagonal prism shapes, conical shapes and/or other shapes, and/or includes counterbores/countersinks/holes having irregular shapes. As used herein the term "cleat/bolt" may be referred to generally as "cleat" and is inclusive of the group of terms cleat, bolt, chisel, and hybrid bolt with chisel end.

BRIEF DESCRIPTION OF DRAWINGS

The embodiments may be better understood, and numerous objects, features, and advantages made apparent to those skilled in the art by referencing the accompanying drawings. These drawings are used to illustrate only typical embodiments of this invention, and are not to be considered limiting of its scope, for the invention may admit to other equally effective embodiments. The figures are not necessarily to scale and certain features and certain views of the figures may be shown exaggerated in scale or in schematic in the interest of clarity and conciseness.

DETAILED DESCRIPTION OF EXEMPLARY EMBODIMENTS

The description that follows includes exemplary apparatus, methods, techniques, and instruction sequences that embody techniques of the inventive subject matter. However, it is understood that the described embodiments may be practiced without these specific details.

Figure 1:
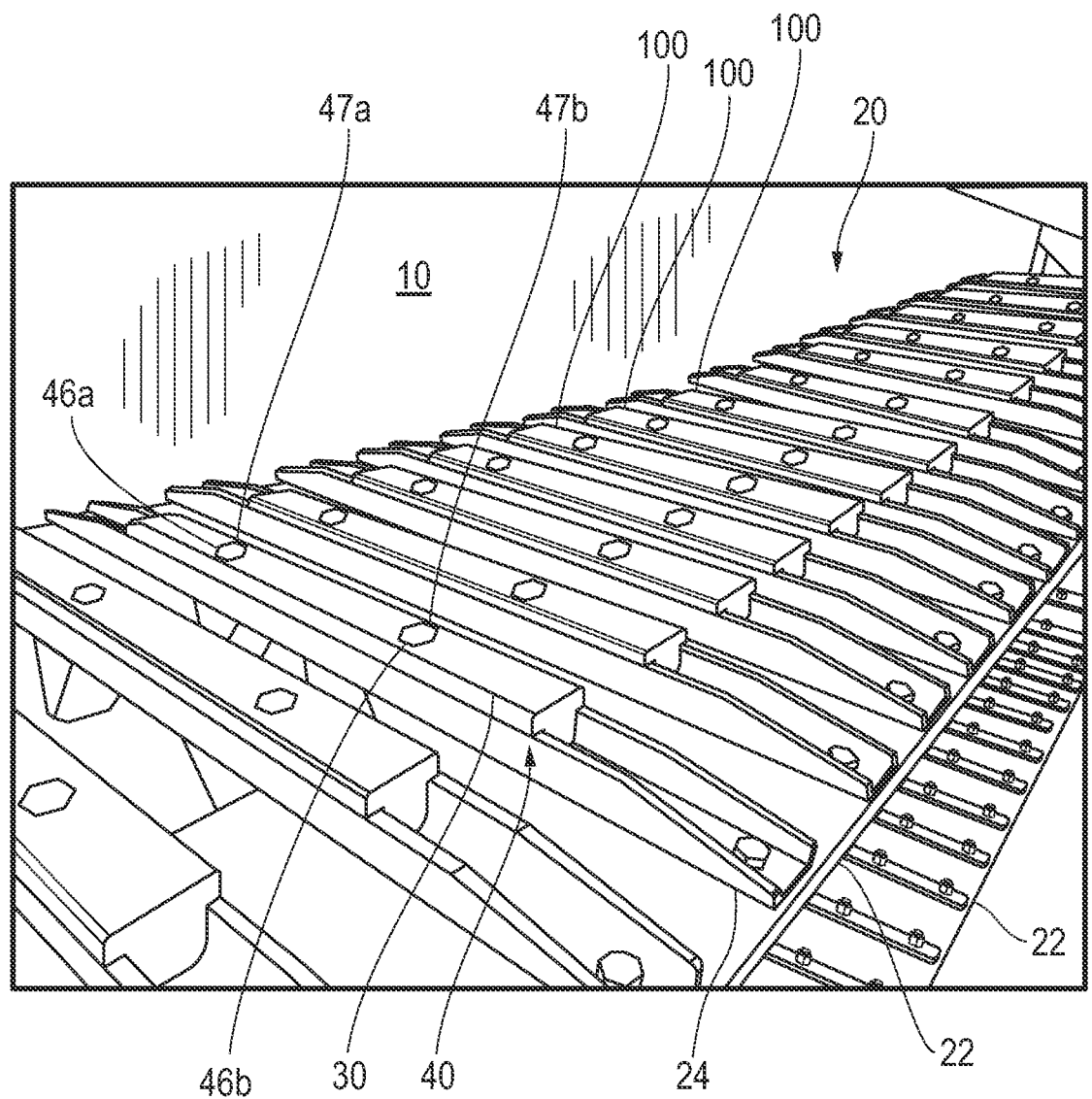
FIG. 1 depicts a perspective view of a portion of an endless track of an endless track vehicle featuring traction apparatus or track cleat configured for use during non-freezing or non-slippery weather conditions.

FIG. 1 shows a perspective view of a portion of an endless track 20 of an endless track vehicle 10 featuring apparatus for traction or track cleat 40 configured for use during non-freezing or non-slippery weather conditions. The apparatus for traction 40 may comprise a body 30, wherein the body 30 is shaped to mount externally to an endless track 20 and may be t-shaped 31. The body 30 may define a first bore 42a extending from a first end 32 of the body 30 to a second end 34 of the body 30, wherein the first bore 42a further has a first counterbore 44a defined by the body 30 (shown in FIG. 10). The body 30 may define a second bore 42b extending from the first end 32 of the body 30 to the second end 34 of the body 30, wherein the second bore 42b further has a second counterbore 44b defined by the body 30 (shown in FIG. 10). A first cleat/bolt 46a having a first cleat/bolt head 47a may be mounted in the first bore 42a and may extend out a distance D4 out of the second end 34 of the body 30 (shown in FIG. 10). The first cleat/bolt head 47a may seat on the first counterbore 44a (shown in FIG. 10). A second cleat/bolt 46b having a second cleat/bolt head 47b may be mounted in the second bore 42b and may extend out a distance D4 out of the second end 34 of the body 30 (shown in FIG. 10). The second cleat/bolt head 47b may seat within the second counterbore 44b (shown in FIG. 10).

Track cleat 40 mounts to and within mating channel 24, which, by way of example only, may be u-shaped, via first cleat/bolt 46a and second cleat/bolt 46b. The first cleat/bolt 46a and the second cleat/bolt 46b may mount through a pair of holes/voids (see FIG. 12 for exemplary hole/void 25a) in the mating channel 24 to mount/fasten the track cleat 40 to mating channel 24. A nut (see FIG. 12 for exemplary nut 28a) may be threaded on the end of each of the first cleat/bolt 46a and the second cleat/bolt 46b to secure the track cleat 40 to the mating channel 24. Individual mating channels 24 are mounted to belts 22 of endless track 20.

The body 30 of a track cleat 40 may be rubber. The body 30 of a track cleat 40 may be a composite material for durability. The body 30 of a track cleat 40 may be a more rigid or more flexible rubber or plastic. The body 30 of a track cleat 40 is preferably a recycled material and/or eco-friendly or environmentally friendly.

When the cleat/bolt head 47a, 47b is below or about even with the first end surface 32 of the body 30 of the track cleat 40, the track cleat may be in a non-slippery position or configuration 100. The non-slippery position or configuration 100 of track cleat 40 is configured for use during non-freezing or non-slippery weather conditions.

Figure 2:
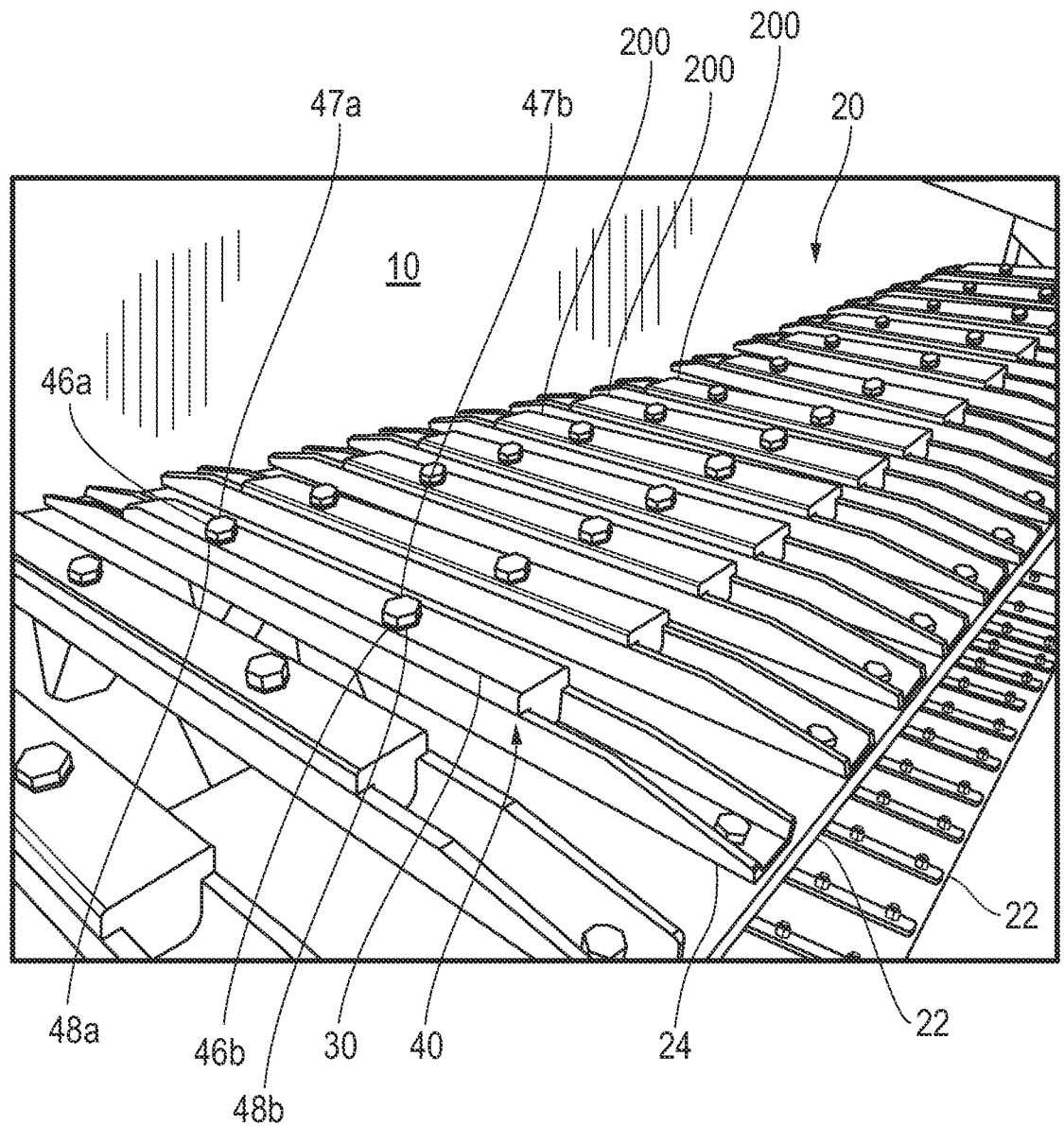
FIG. 2 depicts a perspective view of a portion of an endless track of an endless track vehicle featuring traction apparatus or track cleat configured for use during freezing or muddy, snowy, and/or icy or otherwise slippery weather conditions.

FIG. 2 shows a perspective view of a portion of an endless track 20 of an endless track vehicle 10 featuring apparatus for traction or track cleat 40 configured for use during freezing or muddy, snowy, and/or icy or otherwise slippery weather conditions. The apparatus for traction 40 may comprise a body 30 wherein the body 30 may be t-shaped. The body 30 may define a first bore 42a extending from a first end 32 of the body 30 to a second end 34 of the body 30, wherein the first bore 42a further has a first counterbore 44a defined by the body 30 (shown in FIG. 11). The body 30 may define a second bore 42b extending from the first end 32 of the body 30 to the second end 34 of the body 30, wherein the second bore 42b further has a second counterbore 44b defined by the body 30 (show in FIG. 11). A first cleat/bolt 46a having a first cleat/bolt head 47a, wherein a first nut 48a is fastened to the first cleat/bolt 46a, may be mounted in the first bore 42a and may extend out a distance D4 out of the second end of the body 34 (shown in FIG. 11). The first nut 48a may seat on the first counterbore 4a, and the first cleat/bolt head 47a may extend a distance D5 out of the first end of the body 32 (shown in FIG. 11). A second cleat/bolt 46b having a second cleat/bolt head 47b, wherein a second nut 48b is fastened to the second cleat/bolt 46b, may be mounted in the second bore 42b and may extend a distance D4 out of the second end of the body 34 (shown in FIG. 11). The second nut 48b may seat on the second counterbore 44b, and the second cleat/bolt head 47b may extend a distance D5 out of the first end of the body 32. The first cleat/bolt 46a and second cleat/bolt 47b, by way of example only, may each be a bolt having a flat end bolt head 47a, 47b, or be a cleat/bolt 246 having cleat bolt head 247 having cleat/bolt head end 250, which may be, by way of example only, pointed or conical or frustoconical 247 (see FIG. 13 & FIG. 14).

Track cleat 40 mounts to mating channel 24, which by way of example only may be u-shaped, via first cleat/bolt 46a and second cleat/bolt 46b. The first cleat/bolt 46a and the second cleat/bolt 46b may mount through a pair of holes/voids (see FIG. 12 for exemplary hole/void 25a) in/defined by the mating channel 24 to mount/fasten the track cleat 40 to mating channel 24. A nut (see FIG. 12 for exemplary nut 28a) may be threaded on the end of each of the first cleat/bolt 46a and the second cleat/bolt 46b to secure the track cleat 40 to the mating channel 24. Individual mating channels 24 are mounted to belts 22 of endless track 20.

The body 30 of a track cleat 40 may be rubber. The body 30 of a track cleat 40 may be a composite material for durability. The body 30 of a track cleat 40 may be a more rigid or more flexible rubber or plastic. The body 30 of a track cleat 40 is preferably a recycled material and/or eco-friendly or environmentally friendly.

When the cleat/bolt head 47a, 47b extends a distance D5 out of the first end surface 32 of the body 30 of the track cleat 40, the track cleat 40 may be in a slippery position or configuration 200. The slippery position or configuration 200 of track cleat 40 is configured for use during freezing or muddy, snowy, and/or icy or otherwise slippery weather conditions.

Figure 3:
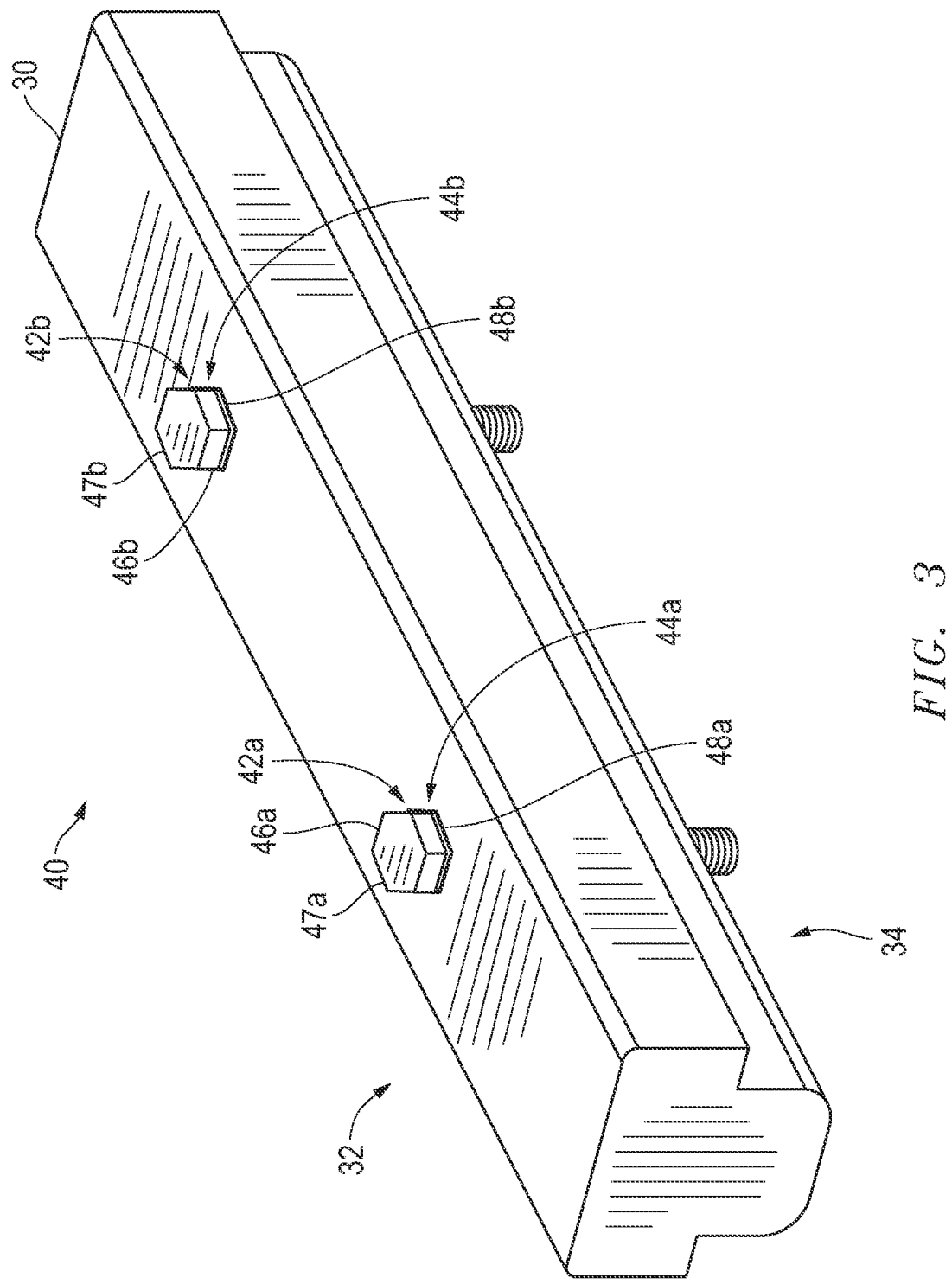
FIG. 3 depicts a perspective view of a traction apparatus or track cleat configured for use during freezing or muddy, snowy, and/or icy or otherwise slippery weather conditions.

FIG. 3 shows a perspective view of the traction apparatus or track cleat 40 of FIG. 2 configured for use during freezing or muddy, snowy, and/or icy or otherwise slippery weather conditions. The apparatus for traction 40 may comprise a body 30 wherein the body 30 may t-shaped. The body 30 may define a first bore 42a extending from a first end 32 of the body 30 to a second end 34 of the body 30, wherein the first bore 42a further has a first counterbore 44a defined by the body 30 (shown in FIG. 11). The body 30 may define a second bore 42b extending from the first end 32 of the body 30 to the second end 34 of the body 30, wherein the second bore 42b further has a second counterbore 44b defined by the body 30 (show in FIG. 11). A first cleat/bolt 46a having a first cleat/bolt head 47a, wherein a first nut 48a is fastened to the first cleat/bolt 46a, may be mounted in the first bore 42a and may extend out a distance D4 out of the second end of the body 34 (shown in FIG. 11). The first nut 48a may seat on the first counterbore 44a, and the first cleat/bolt head 47a may extend a distance D5 out of the first end of the body 32 (shown in FIG. 11). A second cleat/bolt 46b having a second cleat/bolt head 47b, wherein a second nut 48b is fastened to the second cleat/bolt 46b, may be mounted in the second bore 42b and may extend a distance D4 out of the second end of the body 34 (shown in FIG. 11). The second nut 48b may seat on the second counterbore 44b, and the second cleat/bolt head 47b may extend a distance out D5 of the first end of the body 32 (shown in FIG. 11).

Figure 4:
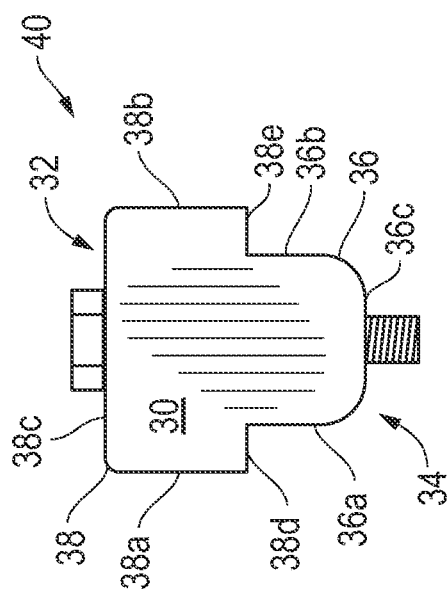
FIG. 4 depicts an end view of a traction apparatus or track cleat configured for use during freezing or muddy, snowy, and/or icy or otherwise slippery weather conditions.

FIG. 4 shows an end view of a traction apparatus or track cleat 40 of FIG. 2 configured for use during freezing or muddy, snowy, and/or icy or otherwise slippery weather conditions. Referring to the track cleat 40 of both FIG. 1 and/or FIG. 2, the body 30 of a track cleat 40 is shaped to mount externally to an endless track 20 and may be t-shaped 31. By way of example only, a t-shaped 31 body 30 may be substantially t-shaped 31, may have rounded or bevelled edges, may have 90 degree edges, may have greater or smaller than 90 degree edges and/or may have a combination of rounded or bevelled edges or 90 degree edges or greater or smaller than 90 degree edges. The body 30 of a track cleat 40 may have a first end 32 and a second end 34. By way of example only, a t-shaped body 30 may have tail 36. Tail 36 may comprise a first side of tail 36a, a second side of tail 36b, and a third side of tail 36c. First side of tail 36a and second side of tail 36b may be parallel or substantially parallel, but must not necessarily be parallel or substantially parallel. By way of example only, a t-shaped body 30 may have head 38. Head 38 may comprise a first side of head 38a, a second side of head 38b, a third side of head 38c, a fourth side of head 38d, and a fifth side of head 38e. First side of head 38a and second side of head 38b may be parallel or substantially parallel, but must not necessarily be parallel or substantially parallel. Third side of head 38c and third side of tail 36c may be parallel or substantially parallel, but must not necessarily be parallel or substantially parallel.

Figure 5:
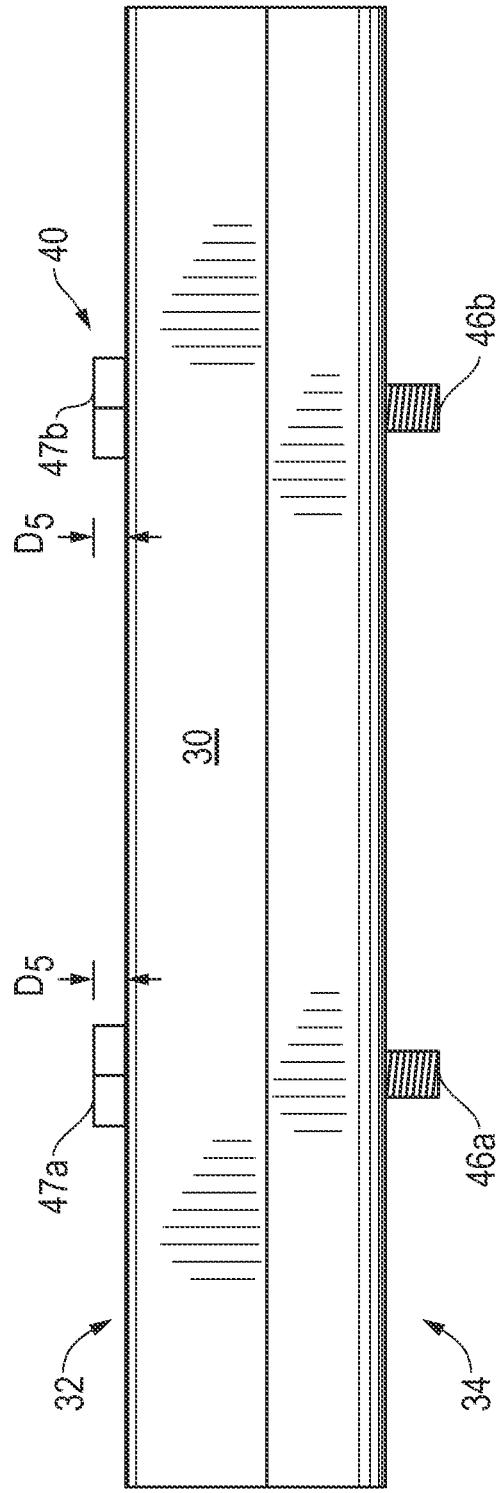
FIG. 5 depicts a side view of a traction apparatus or track cleat configured for use during freezing or muddy, snowy, and/or icy or otherwise slippery weather conditions.

FIG. 5 shows a side view of a traction apparatus or track cleat 40 of FIG. 2 configured for use during freezing or muddy, snowy, and/or icy or otherwise slippery weather conditions. By way of example only, the first cleat/bolt head 47a may extend a distance D5 in the range of about 0.75 to about 1 inch out of the first end 32 of the body 30, and the second cleat/bolt head 47b may extend a distance D5 in the range of about 0.75 to about 1 inch out of the first end 32 of the body 30.

Figure 6:
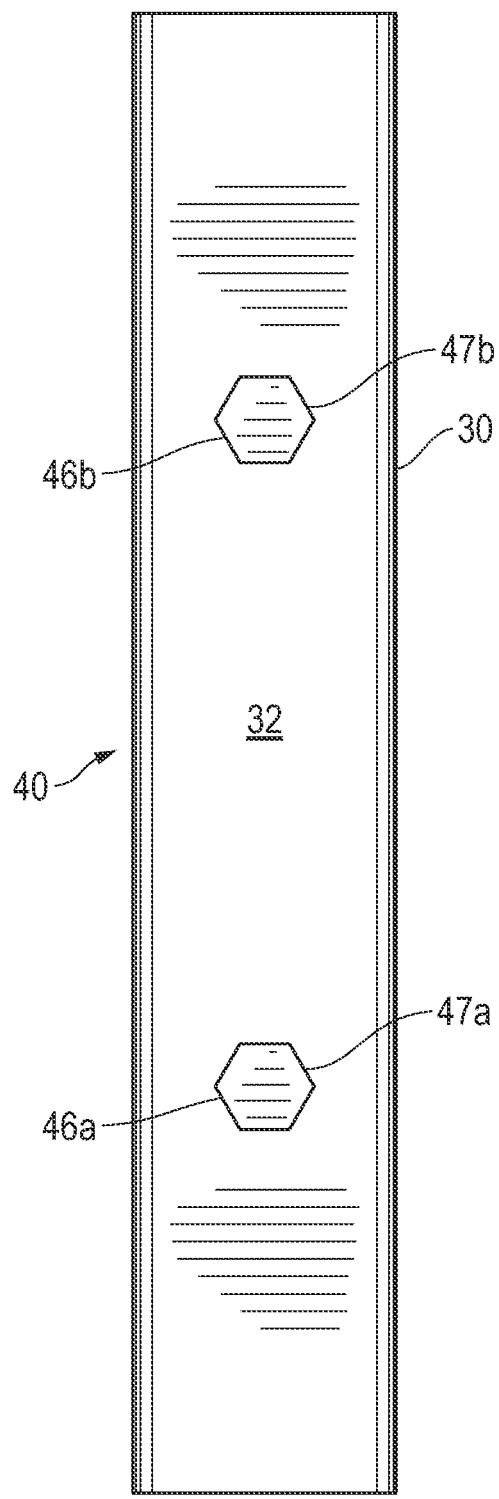
FIG. 6 depicts a top view of a traction apparatus or track cleat configured for use during freezing or muddy, snowy, and/or icy or otherwise slippery weather conditions.

FIG. 6 shows a top view of a traction apparatus or track cleat 40 of FIG. 2 configured for use during freezing or muddy, snowy, and/or icy or otherwise slippery weather conditions. The first cleat/bolt head 47a of first cleat/bolt 46a extends out a distance D5 from first end 32 of body 30 of track cleat 40. The second cleat/bolt head 47b of the second cleat/bolt 46b extends out a distance D5 from first end 32 of body 30 of track cleat 40.

Figure 7:
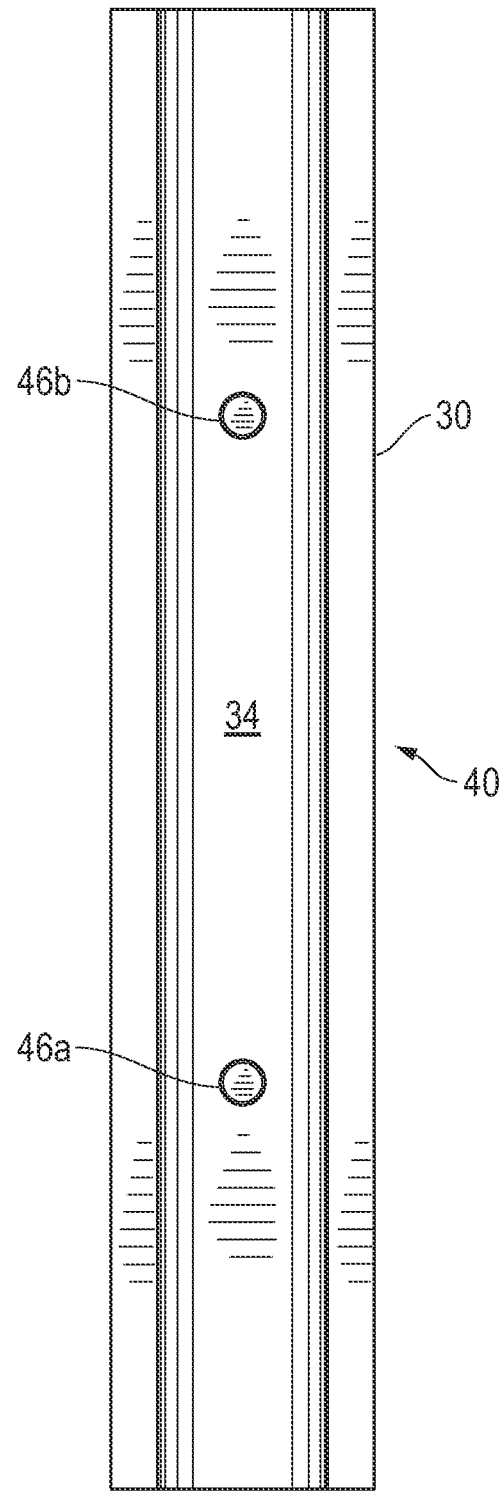
FIG. 7 depicts a bottom view of a traction apparatus or track cleat configured for use during freezing or muddy, snowy, and/or icy or otherwise slippery weather conditions.

FIG. 7 shows a bottom view of a traction apparatus or track cleat 40 of FIG. 2 configured for use during freezing or muddy, snowy, and/or icy or otherwise slippery weather conditions. The first cleat/bolt 46a extends out a distance D4 from the second end 34 of body 30 of track cleat 40. The second cleat/bolt 46b extends out a distance D4 from the second end 34 of body 30 of track cleat 40.

Figure 8:
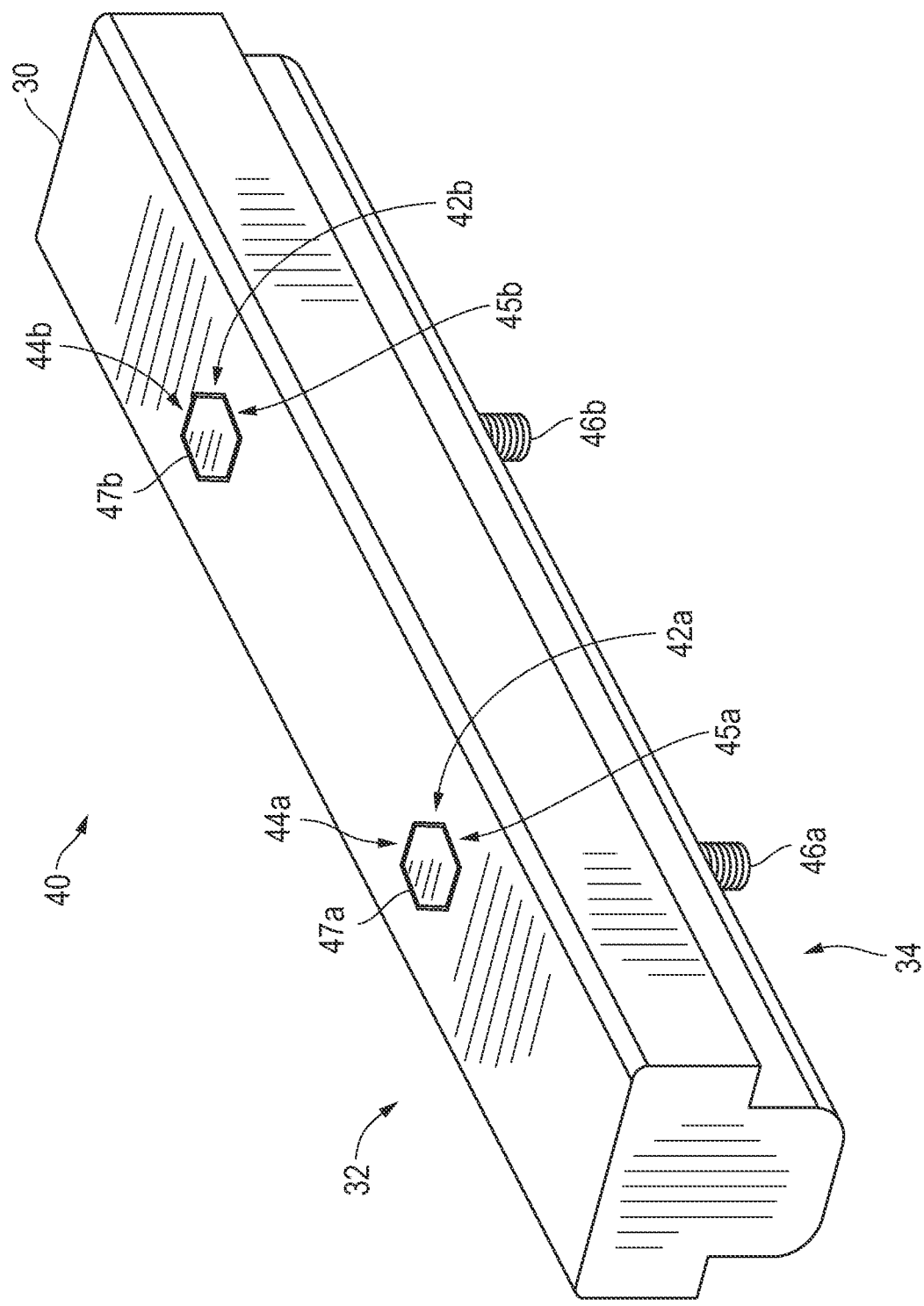
FIG. 8 depicts a perspective view of a traction apparatus or track cleat configured for use during non-freezing or non-slippery weather conditions.

FIG. 8 shows a perspective view of a traction apparatus or track cleat 40 of FIG. 1 configured for use during non-freezing or non-slippery weather conditions. The apparatus for traction 40 may comprise a body 30, wherein the body 30 may be t-shaped. The body 30 may define a first bore 42a extending from a first end 32 of the body 30 to a second end 34 of the body 30, wherein the first bore 42a further has a first counterbore 44a defined by the body 30 (shown in FIG. 10). The body 30 may define a second bore 42b extending from the first end 32 of the body 30 to the second end 34 of the body 30, wherein the second bore 42b further has a second counterbore 44b defined by the body 30 (shown in FIG. 10). A first cleat/bolt 46a having a first cleat/bolt head 47a may be mounted in the first bore 42a and may extend out a distance D4 out of the second end 34 of the body 30 (shown in FIG. 10). The first cleat/bolt head 47a may seat on the first counterbore 44a (shown in FIG. 10). A second cleat/bolt 46b having a second cleat/bolt head 47b may be mounted in the second bore 42b and may extend out a distance D4 out of the second end 34 of the body 30 (shown in FIG. 10). The second cleat/bolt head 47b may seat on the second counterbore 44b (shown in FIG. 10). By way of example only, the shape of the opening of the counterbore 45a, 45b may be hexagonal.

Figure 9:
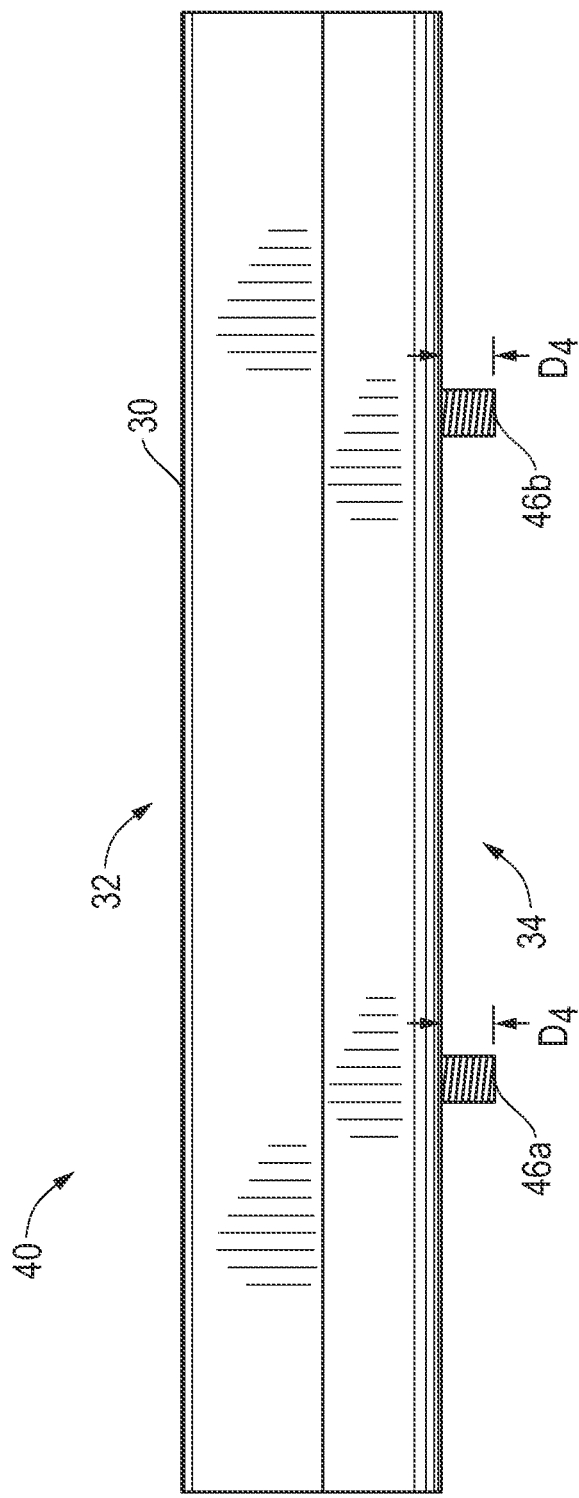
FIG. 9 depicts a side view of a traction apparatus or track cleat configured for use during non-freezing or non-slippery weather conditions.

FIG. 9 shows a side view of a traction apparatus or track cleat 40 of FIG. 1 configured for use during non-freezing or non-slippery weather conditions. Track cleat 40 has body 30. Body 30 has first end 32 and second end 34. First cleat/bolt 46a and second cleat/bolt 46b each extend a distance D4 out of second end 34.

Figure 10:
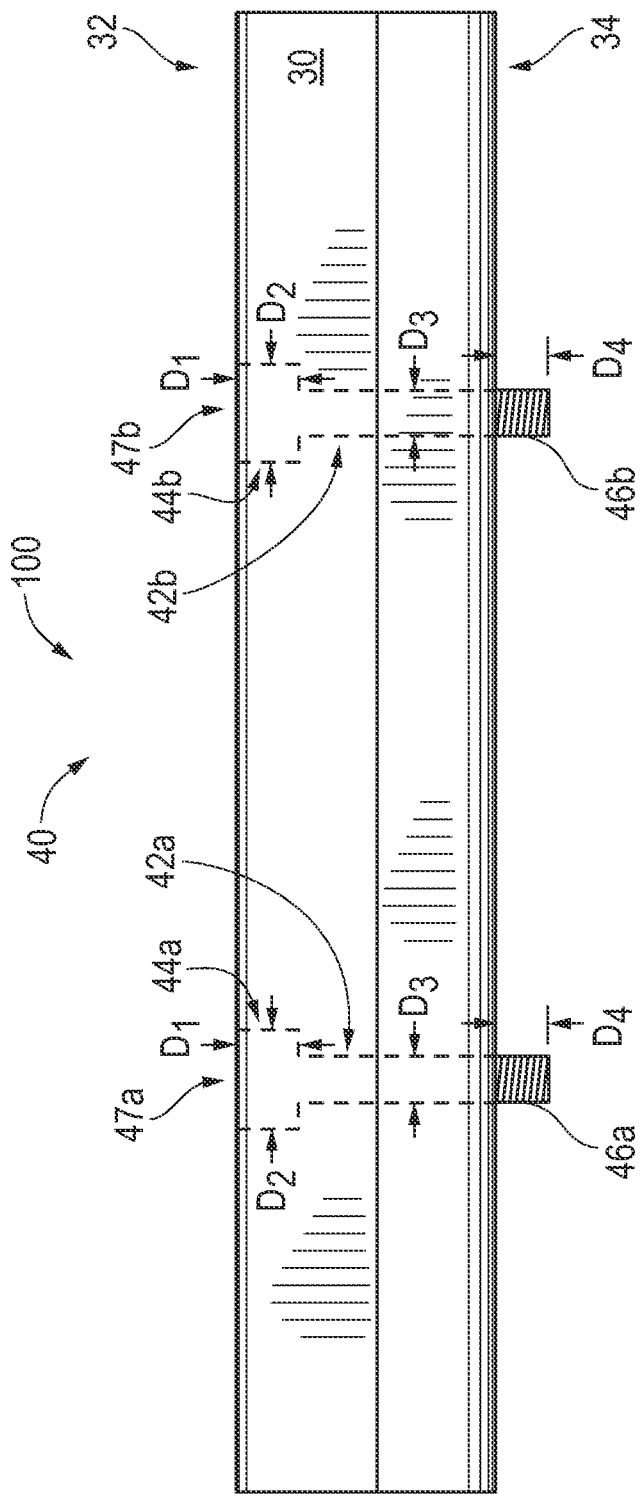
FIG. 10 depicts a side view of a track apparatus or track cleat configured for use during non-freezing or non-slippery weather conditions, wherein the body defines a bore and counterbore, the bore and counterbore being outlined by dashed lines.

FIG. 10 shows a side view of a track apparatus or track cleat 40 of FIG. 1 configured for use during non-freezing or non-slippery weather conditions, where bores 42a, 42b and counterbores 44a, 44b are outlined with dashed lines. The track cleat 40 may be in a non-slippery position or configuration 100. The body 30 defines counterbore 44a having depth D1 from the first end 32 of body 30. The body defines counterbore 44a having width D2. The body defines bore 42a having width D3. The body 30 defines counterbore 44b having depth D1 from the first end 32 of body 30. The body defines counterbore 44b having width D2. The body defines bore 42b having width D3. Bore 42a width D3 is less than counterbore 44a width D2. Bore 42b width D3 is less than counterbore 44b width D2. Depth D1 of counterbores 44a, 44b may depend upon the height of nut 48a, 48b and/or cleat/bolt head 47a, 47b, or may be approximately equivalent to the height of nut 48a, 48b and/or cleat/bolt head 47a, 47b. By way of example only, depth D1 of counterbores 44a, 44b may extend half the distance of the first end 32 of body 30. Width D2 of counterbores 44a, 44b may depend upon the width of nut 48a, 48b and/or cleat/bolt head 47a, 47b (e.g. the design tolerance for stability may have a narrow clearance fit, slight interference fit, or transitional fit with the rubber). By way of example only, the shape of the opening of the counterbore 45a, 45b may be hexagonal (shown in FIG. 8). Shape 45a, 45b (shown in FIG. 8) of counterbores 44a, 44b may depend upon the shape of nut 48a, 48b and or cleat/bolt head 47a, 47b. Width D3 of bores 42a, 42b may depend upon the width of the cleat/bolt 46a, 46b.

Figure 11:
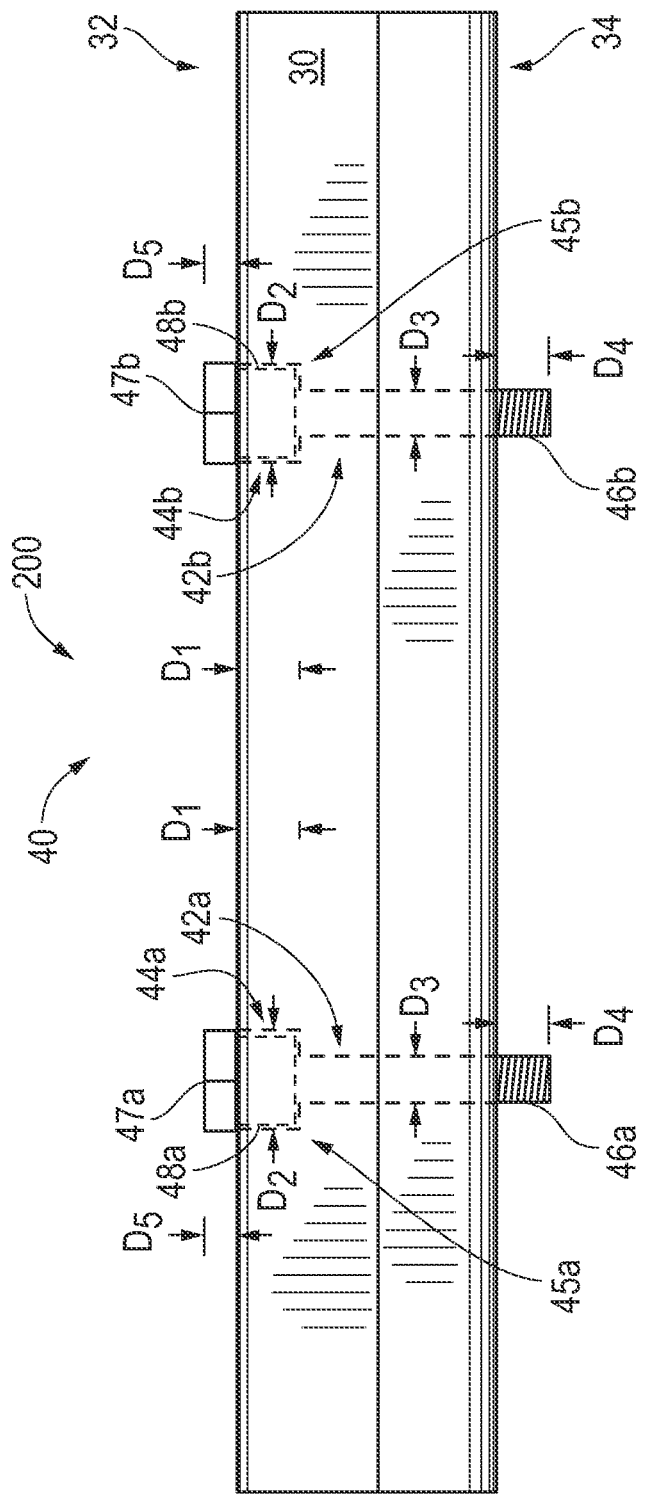
FIG. 11 depicts a side view of a track apparatus or track cleat configured for use during freezing or muddy, snowy, and/or icy or otherwise slippery weather conditions, wherein the body defines a bore and counterbore, the bore and counterbore being outline by dashed lines.

FIG. 11 shows a side view of a track apparatus or track cleat 40 of FIG. 2 configured for use during freezing or muddy, snowy, and/or icy or otherwise slippery weather conditions, where bores 42a, 42b and counterbores 44a, 44b are outlined with dashed lines. The track cleat 40 may be in a slippery position or configuration 200. The body 30 defines counterbore 44a having depth D1 from the first end 32 of body 30. The body defines counterbore 44a having width D2. The body defines bore 42a having width D3. The body 30 defines counterbore 44b having depth D1 from the first end 32 of body 30. The body defines counterbore 44b having width D2. The body defines bore 42b having width D3. Bore 42a width D3 is less than counterbore 44a width D2. Bore 42b width D3 is less than counterbore 44b width D2. Depth D1 of counterbores 44a, 44b may depend upon the height of nut 48a, 48b and/or cleat/bolt head 47a, 47b, or may be approximately equivalent to the height of nut 48a, 48b and/or cleat/bolt head 47a, 47b. By way of example only, depth D1 of counterbores 44a, 44b may extend half the distance of the first end 32 of body 30. Width D2 of counterbores 44a, 44b may depend upon the width of nut 48a, 48b and/or cleat/bolt head 47a, 47b (e.g. the design tolerance for stability may have a narrow clearance fit, slight interference fit, or transitional fit with the rubber). By way of example only, the tolerance for slippery and/or non-slippery condition between the counterbores 44a, 44b and respective cleat/bolt head 47a, 47b may be from about 0.64 to about 0.32 inches clearance fit, and for example, having hex-shaped counterbores 44a, 44b. Shape 45a, 45b of counterbores 44a, 44b may depend upon the shape of nut 48a, 48b and or cleat/bolt head 47a, 47b. Width D3 of bores 42a, 42b may depend upon the width of the cleat/bolt 46a, 46b.

Figure 12:
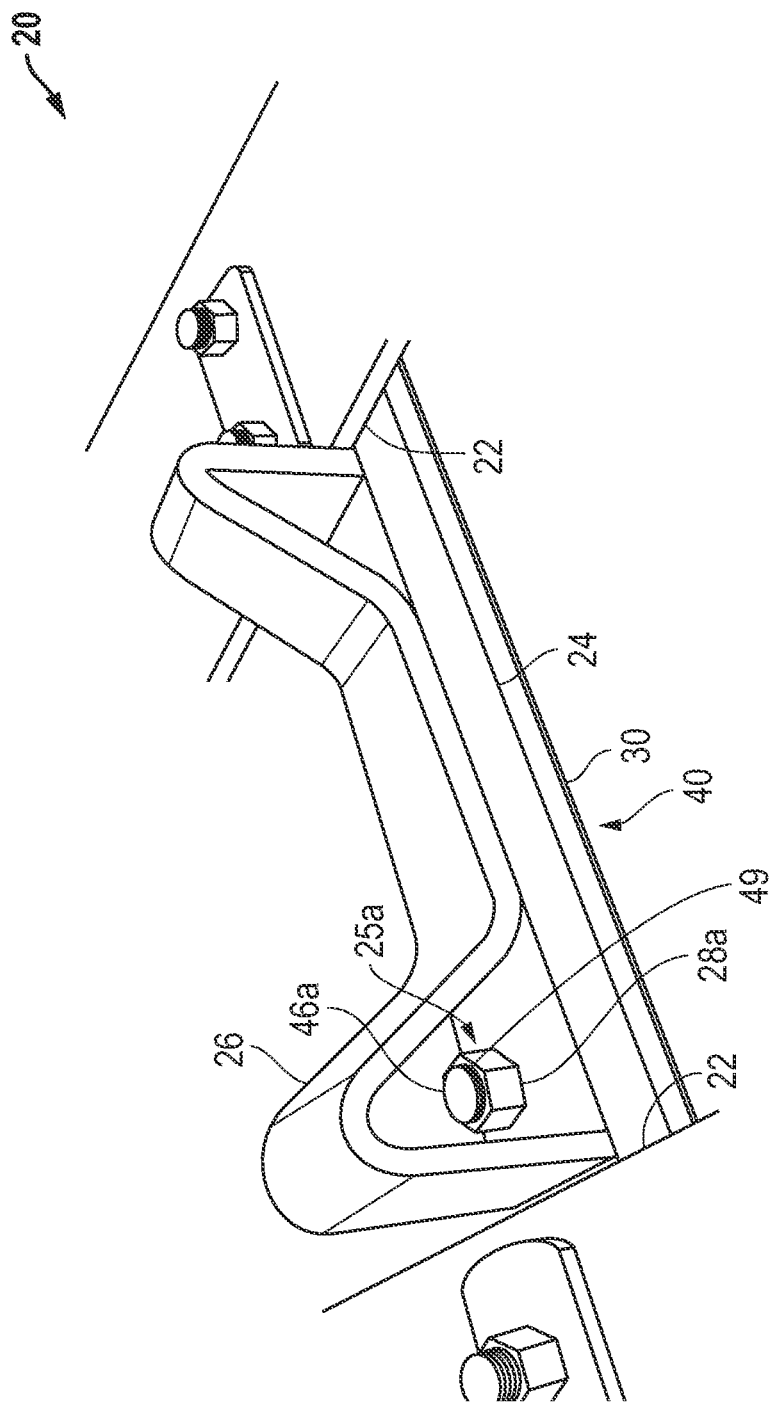
FIG. 12 depicts a perspective view of an inner portion of an endless track having a track apparatus or track cleat mounted to a mating channel and configured for use during freezing of muddy, snow, and/or icy or otherwise slippery weather conditions.

FIG. 12 shows a perspective view of an inner portion of an endless track 20 having a track apparatus or track cleat 40 mounted to a mating channel 24 and configured for use during freezing of muddy, snow, and/or icy or otherwise slippery weather conditions. Track cleat 40 has body 30. Track cleat 40 mounts to mating channel 24, which by way of example only may be u-shaped, via first cleat/bolt 46a and second cleat/bolt 46b (not illustrated in FIG. 12). Mating channel 24 has guide structure or guide groove 26. The first cleat/bolt 46a and the second cleat/bolt 46b (not illustrated in FIG. 12) may mount through a first hole/void 25a and a second hole/void (not illustrated in FIG. 12) in/defined by the mating channel 24 to mount/fasten the track cleat 40 to mating channel 24. A first channel mounting nut 28a may be threaded on the end of the first cleat/bolt 46a and a second channel mounting nut (not illustrated in FIG. 12) may be threaded on the end of the second cleat/bolt 46b (not illustrated in FIG. 12) to secure the track cleat 40 to the mating channel 24. Individual mating channels 24 are mounted to belts 22 of endless track 20. By way of example only, a track cleat 40 may be securely mounted to mating channel 24 via nuts 28a when at least two (2) threads of cleat/bolts 46a, 46b are exposed after fastening nuts onto ends of cleat/bolts 46a, 46b.

A track cleat 40 may comprise two countersunk cleat/bolts 46a, 46b in the summer or during non-freezing or non-slippery weather conditions. The track cleat 40 may comprise two of the combination of a nut 48a, 48b and protruding cleat/bolt 46a, 46b in the winter during freezing or muddy, snowy, and/or icy or otherwise slippery weather conditions or for improved traction. Maintenance on the exemplary embodiments of a track cleat 40 is inexpensive, for example, maintenance may include replacement of cleat/bolts 46a, 46b or nuts 48a, 48b which by way of the present design are directly accessible. Further, the exemplary embodiments of track cleat 40 may endure a long period of use without need for repair and/or replacement; moreover, the exemplary embodiments resist detrimental changes to the integrity of the track cleat 40 or track cleat body 30.

The cleat/bolt head 47a, 47b may be below or about even with the first end surface 32 of the body 30 of the track cleat 40 during summer weather (i.e. non-slippery conditions) when just the rubber pad of the first end 32 of the body 30 of the track cleat 40 may suffice on a bulldozer 10 track 20, or any other tracked construction vehicle 10. When the cleat/bolt head 47a, 47b is below or about even with the first end surface 32 of the body 30 of the track cleat 40, the track cleat 40 may be in a non-slippery position or configuration 100. During winter snow, ice, and mud season (i.e. slippery conditions) additional traction may be needed. The cleat/bolt(s) 46a, 46b used during the summer season (i.e. non-slippery conditions) can be removed and stored, and a third and fourth cleat/bolt 52a, 52b (not shown but akin to 46a,b), which by way of example only, may be a longer cleat/bolt can be installed along with a nut 48a, 48b that will permit the hardened cleat/bolt head 47a, 47b and nut 48a, 48b, which acts as a spacer, to cause the cleat/bolt head 47a, 47b and nut 48a, 48b to protrude above the first end 32 of the rubber track cleat 40 to provide "bite" into/traction on a slippery surface (e.g. ice or an otherwise snow-packed job site location). The cleat/bolt 46a, 46b may thread into the same sub-structure or mating channel 24 or portion of the track 20. When the cleat/bolt head 47a, 47b extends a distance out of the first end surface 32 of the body 30 of the track cleat 40, the track cleat 40 may be in a slippery position or configuration 200. By way of example only, in another embodiment, the same cleat/bolt(s) 46a, 46b used during the summer season (non-slippery conditions) can be used in the winter season (slippery conditions) if the cleat/bolt(s) 46a, 46b are long enough for addition of spacer nuts 48a, 48b and still are able to securely mount track cleat 40 to mating channel 24. By way of example only, a track cleat 40 may be securely mounted to mating channel 24 via nuts (see FIG. 12 for exemplary nut 28a) when at least two (2) threads 49 of cleat/bolts 46a, 46b are exposed after fastening nuts onto ends of cleat/bolts 46a, 46b (in essence the cleat/bolts 46a, 46b may be double nutted, e.g., via nuts 28a, 48a).

In one exemplary embodiment, an apparatus for traction 40 for an endless track 20 of an endless track vehicle 10 may comprise a body 30 mountable to an endless track 20 exterior; wherein the body 30 defines a first bore 42a extending from a first end 32 of the body 30 to a second end 34 of the body 30, wherein the first bore 42a further has a first counterbore 44a defined by the body 30; wherein the body 30 defines a second bore 42b extending from the first end 32 of the body 30 to the second end 34 of the body 30, wherein the second bore 42b further has a second counterbore 44b defined by the body 30; a first slippery condition position 200 wherein a first cleat/bolt 46a having a first cleat/bolt head 47a, wherein a first nut 48a is fastened to the first cleat/bolt 46a, the first cleat/bolt 46a mounted in the first bore 42a and extending out a distance out of the second end 34 of the body 30, wherein the first nut 48a seats within the first counterbore 44a, wherein the first cleat/bolt head 47a protrudes out of the first end 32 of the body 30; the first slippery condition position 200 further comprising a second cleat/bolt 46b having a second cleat/bolt head 47b, wherein a second nut 48b is fastened to the second cleat/bolt 46b, the second cleat/bolt 46b mounted in the second bore 42b and extending out a distance out of the second end 34 of the body 30, wherein the second nut 48b seats within the second counterbore 44b, wherein the second cleat/bolt head 47b protrudes out of the first end 32 of the body 30; a second non-slippery condition position 100 wherein another cleat/bolt, selected from the group consisting of the first cleat/bolt 46a and a third cleat/bolt 52a, is mounted in the first bore 42a and extending out a distance out of the second end 34 of the body 30, wherein a head of the other cleat/bolt seats within the first counterbore 44a; and the second non-slippery condition position 100 further comprising wherein an additional cleat/bolt, selected from the group consisting of the second cleat/bolt 46b and a fourth cleat/bolt 52b, is mounted in the second bore 42b and extending out of the second end 34 of the body 30, wherein the head of the additional cleat/bolt seats within the second 44b counterbore.

Figure 13:
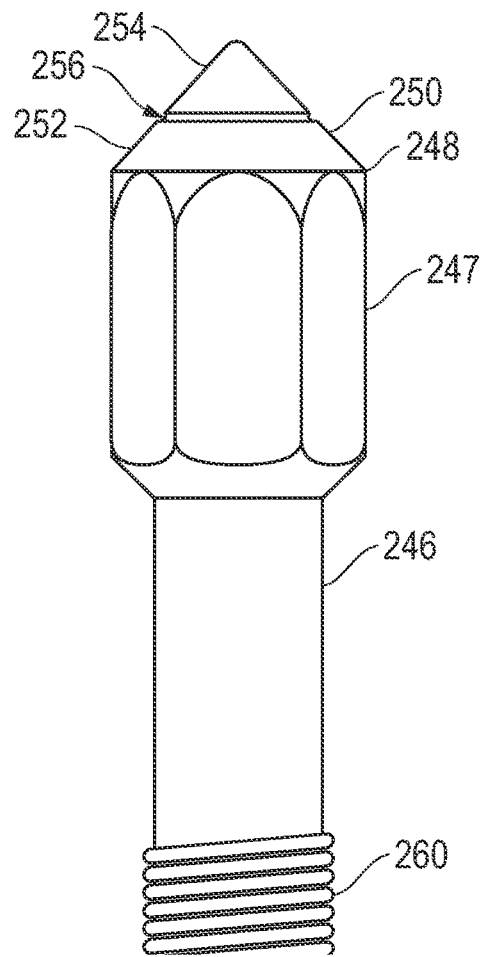
FIG. 13 depicts a side view of another exemplary embodiment of a cleat/bolt or piercing protuberance for use during freezing of muddy, snow, and/or icy or otherwise slippery weather conditions.

FIG. 13 shows a side view of another exemplary embodiment of a cleat/bolt (or ice-pick-type or piercing protuberance) 246 for use during winter, freezing, muddy, snow, and/or icy or otherwise slippery weather conditions (and may be adjustable for non-slippery conditions). A cleat/bolt 246 may be mounted in each of a first bore 42a and a second bore 42b respectively of track cleat or apparatus for traction 40 (not shown). Cleat/bolt 246 may have cleat/bolt head 247. The top end 250 of cleat/bolt head 247 may be conical or frustoconical, or have conical or frustoconical portions or segments. Cleat/bolt 246 may be, in part or in whole, carbide, tungsten steel, or tungsten carbide.

In one exemplary embodiment, an apparatus for traction 40 may comprise a body 30, wherein the body 30 may be t-shaped (not shown in FIG. 13). The body 30 may define a first bore 42a extending from a first end 32 of the body 30 to a second end 34 of the body 30, wherein the first bore 42a further has a first counterbore 44a defined by the body 30 (not shown in FIG. 13). The body 30 may define a second bore 42b extending from the first end 32 of the body 30 to the second end 34 of the body 30, wherein the second bore 42b further has a second counterbore 44b defined by the body 30 (not shown in FIG. 13). The pair of cleat/bolt heads 247 may seat on respective counterbores 44a, 44b (not shown in FIG. 13). By way of example only, the shape of the opening of the counterbore 45a, 45b may be hexagonal (not shown in FIG. 13). A cleat/bolt 246 may be mounted in each of a first bore 42a and a second bore 42b respectively of track cleat or apparatus for traction 40 (not shown in FIG. 13). Cleat/bolt 250 may have cleat/bolt head 247. The top end 250 of cleat/bolt head 247 may be pointed, conical or frustoconical, substantially pointed, conical or frustoconical, or have pointed, conical or frustoconical segments or stacked portions or substantially pointed, conical or frustoconical segments or stacked portions. Cleat/bolt heads 247 may extend a distance D5 out of the first end surface 32 of the body 30 of the track cleat 40 (not shown in FIG. 13). In this exemplary embodiment, nuts are not used/not necessary to mount to cleat/bolt(s) 247 in bores 42a, 44b such that cleat/bolt heads 247 extend a distance D5 out of the first end surface 32 of the body 30 of the track cleat 40. In other embodiments, nuts may be used to mount to cleat/bolt(s) 247 in bores 42a, 44b such that cleat/bolt heads 247 extend a distance D5 out of the first end surface 32 of the body 30 of the track cleat 40. Cleat/bolt 246 may be used when track cleat 40 may be in a slippery position or configuration 200.

Figure 14:
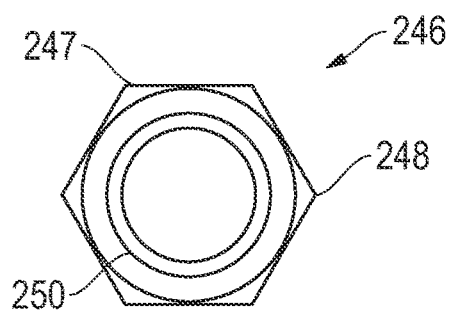
FIG. 14 depicts a top view of the exemplary embodiment of cleat/bolt of FIG. 13.
Figure 15:
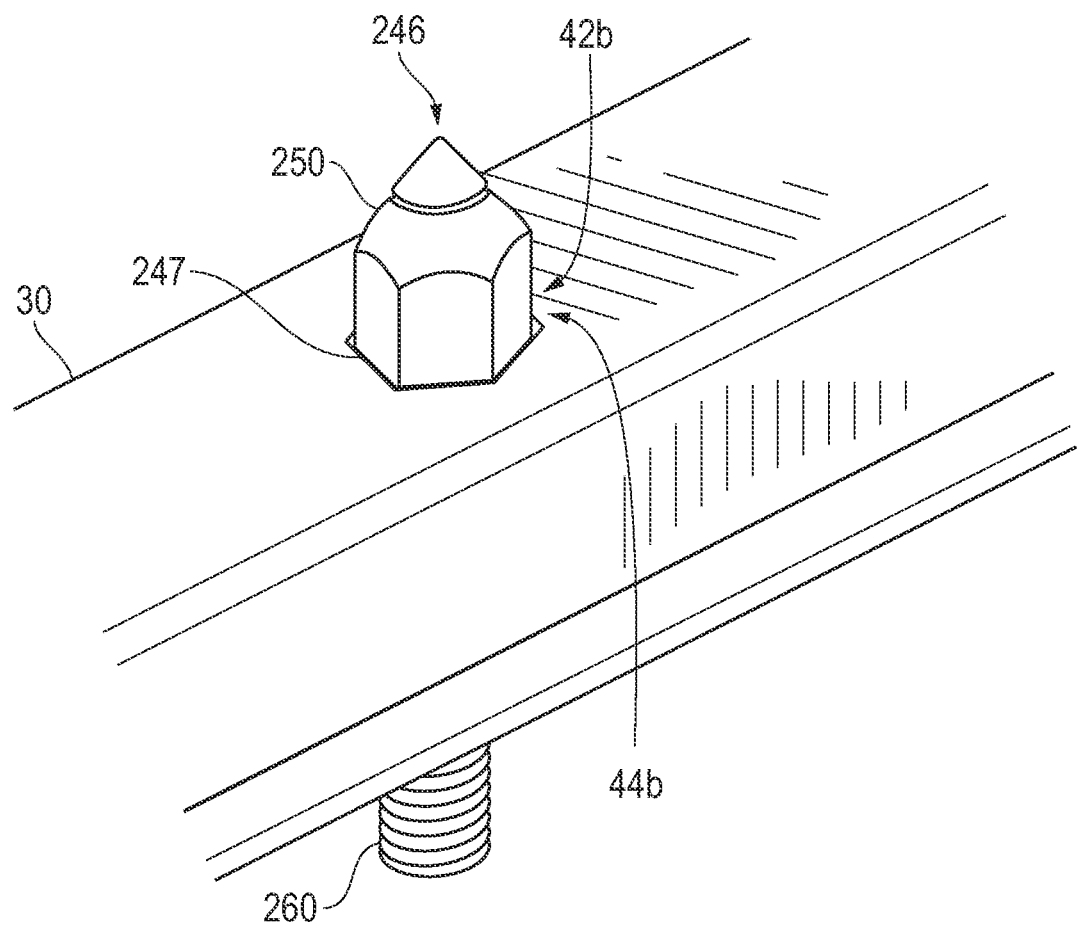
FIG. 15 depicts a perspective view of the exemplary embodiment of cleat/bolt of FIG. 13 mounted in a track cleat.

FIG. 14 shows a top view and FIG. 15 shows a perspective view of the exemplary embodiment of cleat/bolt 246 of FIG. 13. Cleat/bolt 246 has cleat/bolt head 247. The cleat/bolt head 247 may be hex-shaped for enabling connection, and (excluding the top end 250) may have an elevation roughly equivalent to a nut and bolt head of the embodiment of FIG. 3. The top end 250 of cleat/bolt head 247 may comprise a frustoconical segment or portion 252, which may have a hexagonal base 248, and a conical portion 254, wherein a groove 256 separates the frustoconical portion 252 from the conical portion 254. Portions or segments of the top end 250 of cleat/bolt head 247 may be stacked and/or concentric. The top end 250 of cleat/bolt head 247 may have one slope or many different slopes (FIG. 15 represents a greater angle of inclination for the conical portion 254 for piercing/picking, e.g., ice relative to the angle of inclination of the frustoconical portion 252). The opposite end may have threading akin to threads 49. The top end 250 of cleat/bolt head 247 may be made, in part or in whole, of carbide, tungsten steel, or tungsten carbide may be coated, and, by way of example only, may be 0.5 inches in length. Such a cleat/bolt 246 cleat may be commercially available or customizable from Betek GMBH located in Germany.

In one working example of one exemplary embodiment, the length of cleat/bolt 246 from the apex of the conical portion 254 at the top end 250 of cleat/bolt head 247 to opposite end of cleat/bolt 246 may be 88.9 mm. The thread length of the threaded portion 260 of cleat/bolt 246 may be 33±1 mm. The length of bolt head 247 may be 26 mm to the apex of the conical portion 254. The diameter of the base of conical portion 254 of top end 250 of bolt head 247 proximate groove 256 may be 9.1 mm. The hexagonal base 248 may have a width of 21.94 mm.

In one exemplary embodiment, an apparatus for traction 40 for an endless track 20 of an endless track vehicle 10 comprises a body 30 mountable to an endless track 20 exterior; wherein the body 30 defines a first bore 42a extending from a first end 32 of the body 30 to a second end 34 of the body 30, wherein the first bore 42a further has a first counterbore 44a defined by the body 30; wherein the body 30 defines a second bore 42b extending from the first end 32 of the body 30 to the second end 34 of the body 30, wherein the second bore 42b further has a second counterbore 44b defined by the body 30; a first slippery condition position 200 wherein a first cleat/bolt 146 having a first cleat/bolt head 147, the first cleat/bolt 146 mounted in the first bore 42a and extending out a distance D5 out of the second end 34 of the body 30, wherein the first cleat/bolt head 147 seats within the first counterbore 44a, wherein the first cleat/bolt head 147 protrudes out of the first end 32 of the body 30; and the first slippery condition position 200 further comprises a second cleat/bolt 146 having a second cleat/bolt head 147, the second cleat/bolt 146 mounted in the second bore 44b and extending out a distance D5 out of the second end 34 of the body 30, wherein the second cleat/bolt head 147 seats within the second counterbore 44b, wherein the second cleat/bolt head 147 protrudes out of the first end 32 of the body 30. The apparatus for traction 40 for the endless track 20 of the endless track vehicle 10 may further comprise a second non-slippery condition position 100 wherein another cleat/bolt, selected from the group consisting of the first cleat/bolt 146 and a third cleat/bolt 52a, is mounted in the first bore 42a and extending out a distance D4 out of the second end 34 of the body 30, wherein a head of the other cleat/bolt seats within the first counterbore 44a; and the second non-slippery condition position 100 further comprising wherein an additional cleat/bolt, selected from the group consisting of the second cleat/bolt 147 and a fourth cleat/bolt 52b, is mounted in the second bore 42b and extending out a distance D4 of the second end 34 of the body 30, wherein the head of the additional cleat/bolt seats within the second counterbore 44b. It is understood that the present disclosure is not limited to the particular applications and embodiments described and illustrated herein, but covers all such variations thereof as come within the scope of the claims. While the embodiments are described with reference to various implementations and exploitations, it will be understood that these embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. An apparatus for traction for an endless track of an endless track vehicle comprising:
　a body mountable to an endless track exterior;
　wherein the body defines a first bore extending from a first end of the body to a second end of the body, wherein the first bore further has a first counterbore defined by the body;
　wherein the body defines a second bore extending from the first end of the body to the second end of the body, wherein the second bore further has a second counterbore defined by the body;
　a first slippery condition position wherein a first cleat/bolt having a first cleat/bolt head, wherein a first nut is fastened to or integral with the first cleat/bolt, the first cleat/bolt mounted in the first bore and extending out a distance out of the second end of the body, wherein the first nut seats within the first counterbore, wherein the first cleat/bolt head protrudes out of the first end of the body;
　the first slippery condition position further comprising a second cleat/bolt having a second cleat/bolt head, wherein a second nut is fastened to or integral with the second cleat/bolt, the second cleat/bolt mounted in the second bore and extending out a distance out of the second end of the body, wherein the second nut seats within the second counterbore, wherein the second cleat/bolt head protrudes out of the first end of the body;

wherein the first nut and the second nut respectively seat within the first counterbore and second counterbore at a depth D1 in the first slippery condition position;

a second non-slippery condition position wherein another cleat/bolt, selected from the group consisting of the first cleat/bolt and a third cleat/bolt, is mounted in the first bore and extending out a distance out of the second end of the body, wherein a head of the other cleat/bolt seats within the first counterbore; and the second non-slippery condition position further comprising wherein an additional cleat/bolt, selected from the group consisting of the second cleat/bolt and a fourth cleat/bolt, is mounted in the second bore and extending out of the second end of the body, wherein the head of the additional cleat/bolt seats within the second counterbore.

2. The apparatus for traction for the endless track of the endless track vehicle according to claim 1, wherein the first cleat/bolt head and the second cleat/bolt head each protrude out of the first end of the body a distance D5 in the first slippery condition position.

3. The apparatus for traction for the endless track of the endless track vehicle according to claim 1, wherein the head of the other cleat/bolt seats within the first counterbore and the head of the additional cleat/bolt seats within the second counterbore at a depth D1 in the second non-slippery condition position.

4. The apparatus for traction for the endless track of the endless vehicle according to claim 1, wherein the first cleat/bolt head extends a distance in the range of about 0.75 to about 1 inch out of the first end of the body, and wherein the second cleat/bolt head extends a distance in the range of about 0.75 to about 1 inch out of the first end of the body.

5. The apparatus for traction for the endless track of the endless vehicle according to claim 1, wherein the body is made of a recycled material.

6. The apparatus for traction for the endless track of the endless vehicle according to claim 1, wherein the body is t-shaped.

7. A method of modifying an apparatus for traction of an endless track of an endless track vehicle, comprising the steps of:

mounting or integrating a first nut onto and adjacent a first head of a first cleat/bolt;

mounting or integrating a second nut onto and adjacent a second head of a second cleat/bolt;

mounting the first cleat/bolt to a track cleat, wherein a body of the track cleat defines a first bore having a first counterbore, seating the first nut within the first counterbore, and protruding the first cleat/bolt head out of a first end of the body;

mounting the second cleat/bolt to the track cleat, wherein the body of the track cleat defines a second bore having second counterbore, and seating the second nut within the second counterbore, and protruding the second cleat/bolt head out of the first end of the body;

for slippery condition positioning, mounting the track cleat onto a mating channel of the endless track of the endless track vehicle;

for non-slippery condition positioning, dismounting the track cleat from the mating channel of the endless track of the endless track vehicle;

removing the first cleat/bolt from the body of the track cleat;

removing the second cleat/bolt from the body of the track cleat;

mounting another cleat/bolt, selected from the group consisting of the first cleat/bolt and a third cleat/bolt, in the first bore in the track cleat and seating the head of the other cleat/bolt within the first counterbore;

mounting an additional cleat/bolt, selected from the group consisting of the second cleat/bolt and a fourth cleat/bolt, in the second bore in the track cleat and seating the head of the additional cleat/bolt within the second counterbore; and mounting the track cleat onto the mating channel of the endless track of the endless track vehicle.

8. A method of modifying an apparatus for traction of an endless track of an endless track vehicle, comprising the steps of:

mounting a first cleat/bolt to a track cleat, wherein a body of the track cleat defines a first bore having a first counterbore, and seating a first cleat/bolt head within the first counterbore;

mounting a second cleat/bolt to the track cleat, wherein the body of the track cleat defines a second bore having second counterbore, and seating a second cleat/bolt head within the second counterbore;

for non-slippery condition positioning, mounting the track cleat onto a mating channel of the endless track of the endless track vehicle;

for slippery condition positioning, dismounting the track cleat from the mating channel of the endless track of the endless track vehicle;

removing the first cleat/bolt from the body of the track cleat;

removing the second cleat/bolt from the body of the track cleat;

mounting a first nut onto and adjacent a first head of another cleat/bolt, selected from the group consisting of the first cleat/bolt and a third cleat/bolt;

mounting a second nut onto and adjacent a second head of an additional cleat/bolt, selected from the group consisting of the second cleat/bolt and a fourth cleat/bolt;

mounting the other cleat/bolt in the first bore in the track cleat, seating the first nut within the first counterbore, and protruding the first cleat/bolt head out of a first end of the body;

mounting the additional cleat/bolt in the second bore in the track cleat, seating the second nut within the second counterbore, and protruding the second cleat/bolt head out of a first end of the body; and mounting the track cleat onto the mating channel of the endless track of the endless track vehicle.

9. A method of modifying an apparatus for traction of an endless track of an endless track vehicle, comprising the steps of:

mounting a first cleat/bolt to a track cleat, wherein a body of the track cleat defines a first bore having a first counterbore, and seating a first cleat/bolt head within the first counterbore;

mounting a second cleat/bolt to the track cleat, wherein the body of the track cleat defines a second bore having second counterbore, and seating a second cleat/bolt head within the second counterbore;

for non-slippery condition positioning, mounting the track cleat onto a mating channel of the endless track of the endless track vehicle;

for slippery condition positioning, dismounting the track cleat from the mating channel of the endless track of the endless track vehicle;

removing the first cleat/bolt from the body of the track cleat;

removing the second cleat/bolt from the body of the track cleat;

mounting a third cleat/bolt in the first bore in the track cleat, seating a head of the third cleat/bolt within the first counterbore, and protruding the head of the third cleat/bolt out of a first end of the body;

mounting a fourth cleat/bolt in the second bore in the track cleat, seating a head of the fourth cleat/bolt within the second counterbore, and protruding the head of the fourth cleat/bolt out of a first end of the body; and mounting the track cleat onto the mating channel of the endless track of the endless track vehicle.

* * * * *